US011159384B2

(12) United States Patent
Sharma et al.

(10) Patent No.: US 11,159,384 B2
(45) Date of Patent: Oct. 26, 2021

(54) RUNTIME MONITORING IN INTENT-BASED NETWORKING

(71) Applicant: Hewlett Packard Enterprise Development LP, Houston, TX (US)

(72) Inventors: Puneet Sharma, Palo Alto, CA (US); Huazhe Wang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 7 days.

(21) Appl. No.: 16/398,728

(22) Filed: Apr. 30, 2019

(65) Prior Publication Data

US 2020/0351167 A1   Nov. 5, 2020

(51) Int. Cl.
*H04L 12/24* (2006.01)
*H04L 29/06* (2006.01)

(52) U.S. Cl.
CPC .......... *H04L 41/14* (2013.01); *H04L 41/0806* (2013.01); *H04L 41/0866* (2013.01); *H04L 41/0893* (2013.01); *H04L 41/12* (2013.01); *H04L 63/02* (2013.01)

(58) Field of Classification Search
CPC ............. H04L 41/0866; H04L 41/0806; H04L 41/0893; H04L 41/12; H04L 41/14; H04L 63/02

See application file for complete search history.

(56) References Cited

U.S. PATENT DOCUMENTS

| | | | |
|---|---|---|---|
| 7,539,974 B2* | 5/2009 | Beck | G06F 9/542 717/117 |
| 8,885,461 B2* | 11/2014 | Kini | H04L 45/50 370/228 |
| 9,124,485 B2* | 9/2015 | Heron | H04L 12/287 |
| 9,423,989 B2* | 8/2016 | Rai | G06F 3/122 |

(Continued)

OTHER PUBLICATIONS

James Hongyi Zeng and Peyman Kazemian. "Mini-Stanford Backbone", <https://reproducingnetworkresearch.wordpress.com/2012/07/11/atpg/>, originally posted Jul. 2012, 8 pages. (Year: 2012).*

(Continued)

*Primary Examiner* — George C Neurauter, Jr.
(74) *Attorney, Agent, or Firm* — Hewlett Packard Enterprise

(57) ABSTRACT

Described herein are methods, network devices, systems, and computer-readable media that provide a technical solution for runtime monitoring and visualization of intent-based network policies in a manner that bridges the gap between high-level insights from runtime and low-level network device configurations. A network topology and a plurality of network configurations can be received in an intent-based network and a number of monitoring spots available within the network topology for runtime monitoring of an intent-based network policy among a plurality of intent-based policies can be determined. A plurality of runtime constraints including one or more of time, resource capacity, and bandwidth demand can then be determined based on the network topology and the plurality of network configura- (Continued)

tions. Based on the plurality of runtime constraints, a runtime monitoring schedule that includes at least a flow, a monitoring spot assigned for runtime monitoring of the flow, and a runtime monitoring rule to be applied at the assigned monitoring spot can be generated and implemented.

18 Claims, 6 Drawing Sheets

(56) References Cited

U.S. PATENT DOCUMENTS

| | | | | |
|---|---|---|---|---|
| 10,057,166 | B2* | 8/2018 | Horn | H04L 45/64 |
| 10,305,776 | B2* | 5/2019 | Horn | H04L 41/0873 |
| 10,778,545 | B2* | 9/2020 | Sun | H04L 43/06 |
| 10,862,749 | B1* | 12/2020 | Kiyak | H04L 41/147 |
| 2014/0369209 | A1* | 12/2014 | Khurshid | H04L 41/0869 370/250 |
| 2016/0241436 | A1* | 8/2016 | Fourie | H04L 47/2425 |
| 2017/0317887 | A1 | 11/2017 | Dwaraki et al. | |
| 2018/0278480 | A1 | 9/2018 | Prasad et al. | |
| 2018/0309640 | A1 | 10/2018 | Nagarajan et al. | |
| 2018/0316576 | A1 | 11/2018 | Kang et al. | |
| 2018/0367412 | A1* | 12/2018 | Sethi | H04L 41/0853 |
| 2018/0367416 | A1* | 12/2018 | Nagarajan | H04L 67/34 |
| 2020/0099589 | A1* | 3/2020 | Sethi | H04L 41/0853 |
| 2020/0162337 | A1* | 5/2020 | Jain | H04L 41/20 |
| 2020/0162589 | A1* | 5/2020 | Vijayadharan | H04L 41/0893 |
| 2020/0351167 | A1* | 11/2020 | Sharma | H04L 43/026 |

OTHER PUBLICATIONS

Marian Kiran et al. "Enabling intent to configured scientific networks for high performance demands", Future Generation Computer Systems 79 (2018) pp. 205-214, 10 pages. (Year: 2018).*
Shambwaditya Saha et al. "NetGen: Synthesizing Data-plane Configurations for Network Policies", SOSR2015, Jun. 17-18, 2015, Santa Clara, CA, USA, 6 pages. (Year: 2015).*
Butler, B., Why Cisco's New Intent-Based Networking Could be a Big Deal, (Web Page), Jun. 21, 2017, 8Pgs.
Grabski, S. et al., Orchestrating the Requirements of Intent-Based Networking, (Web Page), Sep. 6, 2018, 3 Pgs.
Liu, C. et al., OpenMeasure: Adaptive Flow Measurement & Inference with Online Learning in SDN, (Research Paper), Apr. 1, 2016, 7 Pgs.
Tang, Y. et al., Automatic Belief Network Modeling via Policy Inference for SDN Fault Localization, (Research Paper), Jan. 20, 2016, Journal of Internet Services and Applications, 18 Pgs.
Tilmans, O. et al., Stroboscope: Declarative Network Monitoring on a Budget, (Research Paper), Retrieved Jan. 7, 2019, 16 Pgs.
Wong, W., Intent-Based Networking in the Data Center: Cisco vs. Juniper, (Web Page), Sep. 11, 2018, 18 Pgs.
Abhashkumar et al., "Supporting Diverse Dynamic Intent-based Policies using Janus", Proceedings of the 13th International Conference on emerging Networking EXperiments and Technologies, 2017, pp. 296-309.
Prakash, et al., "PGA: Using Graphs to Express and Automatically Reconcile Network Policies", Proceedings of the 2015 ACM Conference on Special Interest Group on Data Communication, 2015, pp. 29-42.

* cited by examiner

RUNTIME MONITORING IN INTENT-BASED NETWORKING

BACKGROUND

A key feature of Intent-Based Networking (IBN) is to build a network in a declarative way. IBN allows operators to work close with network intents, which are high level insight or business objectives that specify what needs to be done instead of how to do it. Conventionally, graph models are used to represent intents. Nodes in the graph models are endpoint groups (EPGs) represented using labels. Edges in the graph models are communication intents between EPGs. The intents could be, for example, network reachability, traffic waypoint, performance metrics, temporal or conditional processing, etc. IBN could convert a set of intents into detailed data plane configurations, e.g., forwarding and Access Control List (ACL) rules, which implement the set of intents. With automated configuration generation, there arises the need to provide runtime monitoring of the intent-based network to evaluate whether the network actually behaves over time accurately.

BRIEF DESCRIPTION OF THE DRAWINGS

The following detailed description references the drawings, wherein.

DETAILED DESCRIPTION

Network intents generally refer to desired outcomes driven by business objectives in terms of what is needed from a target network instead of low-level implementations. Network intents can be expressed with technology-agnostic semantic terms, such as, logical labels or tags (e.g., all critical services in the data center are available to remote sites.), whereas low-level configurations are implemented with technology-specific addresses or commands, such as, Internet Protocol (IP) address, Media Access Control (MAC) address, command language interpreter (CLI) network command, etc.

Applying policies is one of the most important components of a network switch for enabling security in the network. Creating, validating, and configuring network intents is often non-scalable and tedious. Conventionally, intent-based network policies are translated into configurations that are pushed to the network devices in a network. For example, network engineers can configure network policies, such as Access Control Lists (ACLs), on a Trivial File Transfer Protocol (TFTP) Server and download the entire configuration onto a network device. Various software solution may be created to host the network devices' configurations. Nonetheless, the running configurations of network devices are often represented in text format, which is difficult to visualize and mange when such configurations are modified across multiple network devices. In particular, it is difficult to verify if the current network configuration indeed matches the network intents specified by the administrator. Therefore, examples of the present disclosure provide a solution for runtime monitoring and visualization of intent-based network policies (also referred to as "intents"), which helps bridge the gap between the high-level insights from runtime and low-level configurations described above. Specifically, an example system solves how to automatically infer runtime intents. To reduce the monitoring space, the example system can use intents extracted from configurations to guide runtime monitoring. Then, the example system can formulate the runtime monitoring as an optimization model. The optimization model determines at least (1) which flows to monitor; (2) where to place monitoring rules; and (3) when to schedule these rules to maximize coverage while meeting an input budget.

Figure 1A:
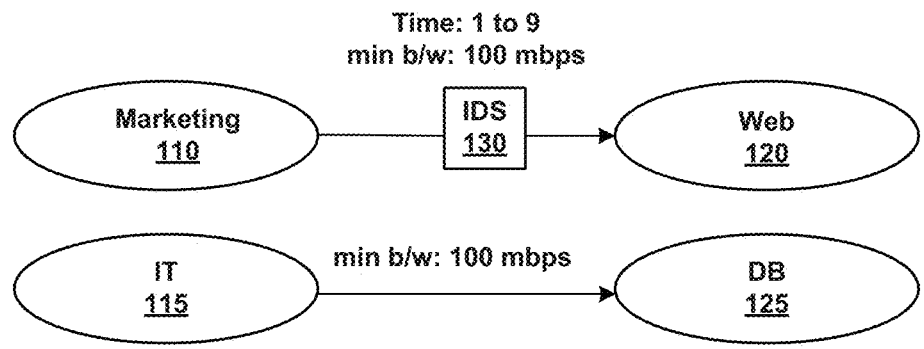
FIGS. 1A-1C illustrate example network intents in intent-based networks in accordance with the present disclosure.
Figure 1B:
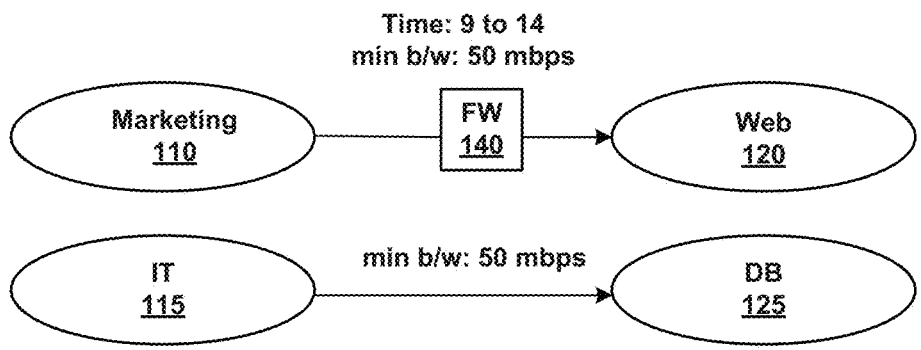
Figure 1C:
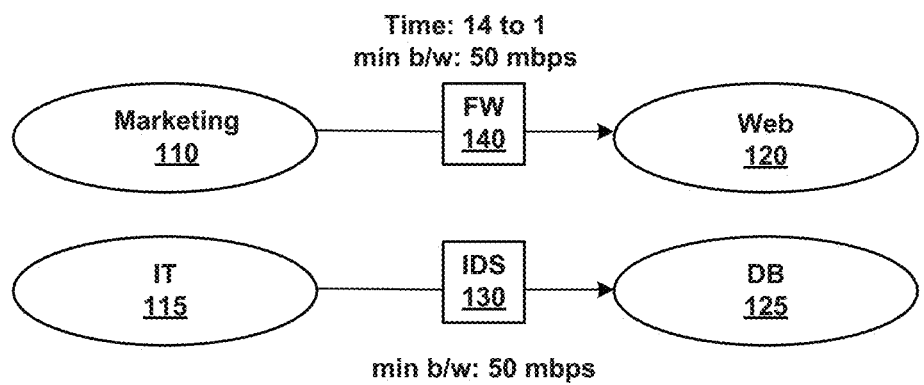

FIGS. 1A-1C illustrate example network intents in intent-based networks in accordance with the present disclosure. Intent-Based Networking (IBN) allows for building a network in a declarative way. In particular, IBN allows operators to work closely with network intents, which are high level insights or business objectives that specify what to do instead of how to do it. Intent specifications may use intuitive graph models to represent intents. In such graph models, nodes are endpoint groups represented using labels. Edges are communication intents. The intents could be about network reachability, traffic waypoint, performance metrics, and/or temporal or conditional processing.

For example, FIGS. 1A to 1C each includes four endpoint groups that are labeled as Marketing 110, IT 115, Web 120, and DB 125, respectively. Here, Marketing 110 may correspond to a first set of network devices associated with employees in the marketing group of a company. Similarly, IT 115 may correspond to a second set of network devices associated with employees in the Information Technology group of the company. Due to difference in job responsibilities, different compute and network devices may have different access to network resources. Such network resources may include, for example, Web 120 that corresponds to a particular website within the enterprise network that may be accessible by the network devices, and DB 125 that corresponds to a particular database within the enterprise network that may be accessible by the network devices. The arrowed edge from Marketing 110 to Web 120 may include a traffic waypoint. FIG. 1A shows a first example intent. This intent may be for traffic flowing from the network devices associated with the Marketing 110 to the particular website Web 120 to pass through an intrusion detection system (IDS) 130. Here, the network devices may refer to any devices connected to the network, and are not limited to devices performing network functions. In addition, the intent may also include a guaranteed minimum bandwidth of 100 mbps for network traffic from Marketing 110 to Web 120 and from IT 115 to DB 125.

FIG. 1B shows a second example intent. In this example intent, traffic flowing from the network devices associated with the Marketing 110 to the particular website Web 120 should pass through a firewall 140. In addition, the intent may also include a guaranteed minimum bandwidth of 50 mbps for network traffic from Marketing 110 to Web 120 and from IT 115 to DB 125.

FIG. 1C shows a third example intent. In this example intent, traffic flowing from the network devices associated with the Marketing 110 to the particular website Web 120 should pass through a firewall 140. Moreover, traffic flowing from the network devices associated with the IT 115 to the particular database DB 125 should pass through IDS 130. In addition, the intent may also include a guaranteed minimum bandwidth of 50 mbps for network traffic from Marketing 110 to Web 120 and from IT 115 to DB 125.

Furthermore, intent may include a component of temporal processing. For example, as shown in FIGS. 1A-1C, a timer may run from value 1 to 14 repeatedly. During time 1 to 9, an example network intent may be defined as the first example intent described above as shown in FIG. 1A; during time 9 to 14, the example network intent may be defined as the second example intent described above as shown in FIG. 1B; during time 14 to 1, the example network intent may be defined as the third example intent described above as shown in FIG. 1C.

With the example set of intents described above, an IBN platform could convert such intents into each detailed data plane configurations, for example, forwarding rules and/or access control list (ACL) rules that implement those intents.

With the automated configuration generation, it is still difficult to obtain an accurate estimation of how the network actually behaves over time; to infer some illustrative intent graphs for the runtime network; etc.

Two approaches may either come with low fidelity or high cost. For example, the first approach is random packet sampling, e.g., via sampling tools such as NetFlow and/or sFlow. However, there is no guarantee on which flows will be sampled. Therefore, the first approach merely provides coarse-grained and inaccurate bandwidth estimations for the majority of prefixes, resulting in low fidelity. The second approach, in order to get a fine-grained view of runtime traffic, is to keep monitoring all flows all the time, resulting in high cost/overhead. For example, adopting the second approach, the network system may monitor all tier-1 Internet Service Provider (ISP) data collected by hundreds of routers over a 10-minute period in the network. Due to the highly skewed traffic distribution, most monitors may not capture any such traffic, e.g., Tier-1 ISP Netflow data. In some cases, as a result, as many as 65% of the prefixes may not be observed.

Example solutions in the present disclosure address how to efficiently conduct runtime monitoring to infer runtime intent without incurring the low fidelity and/or the high cost. Specifically, the example solutions combine runtime monitoring with configuration analysis. By analyzing data plane configurations, an example system according to the present disclosure can identify all pair network reachability. This reduces the monitoring space because only paths having reachable flows need to be monitored. Furthermore, the network reachability can be used to infer communication intents.

Figure 2A:
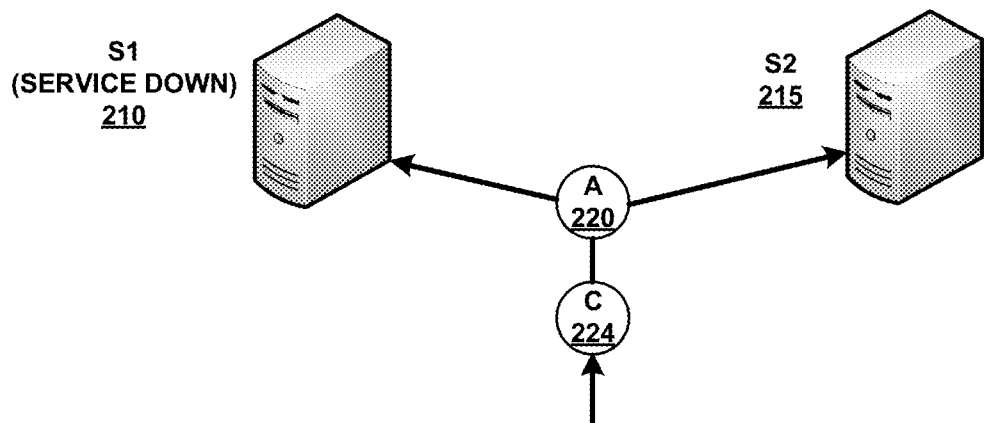
FIGS. 2A-2C illustrate example scenarios for runtime monitoring to overcome according to the present disclosure.
Figure 2B:
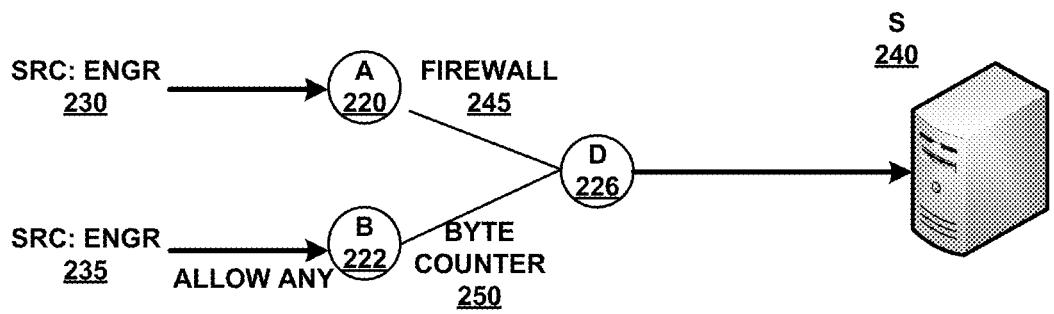
Figure 2C:
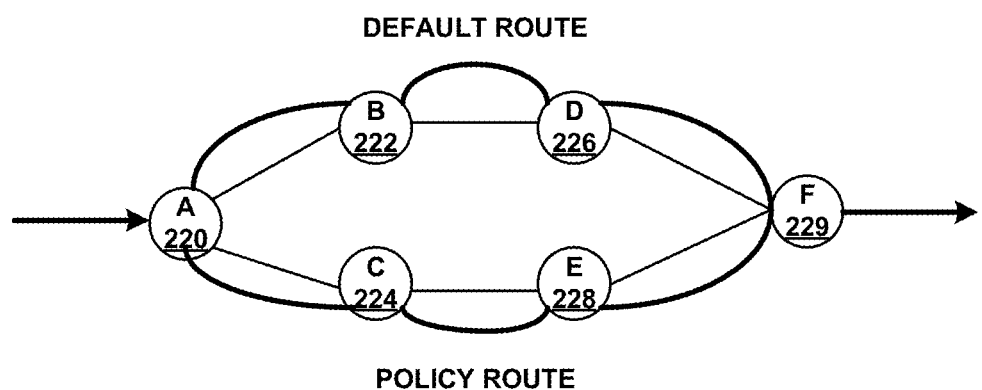

However, several issues may arise when intents are inferred based solely on configuration analysis. FIGS. 2A-2C illustrate example scenarios for runtime monitoring to overcome according to the present disclosure. These example scenarios collectively explain why the intents cannot be inferred solely based on configuration analysis. First, runtime metrics, e.g., bandwidth cost, cannot be inferred from configurations. In addition, there may exist paths extracted from configurations that won't have any active traffic.

For example, FIG. 2A illustrates a scenario involving a service that is down in an intent-based network. Assuming that there are two running network services, namely $S_1$ 210 and $S_2$ 215. Both network services $S_1$ 210 and $S_2$ 215 can announce routes or paths to themselves. At switch C 224, an aggregated rule is inserted for both services $S_1$ 210 and $S_2$ 215. Accordingly, traffic to both network services $S_1$ 210 and $S_2$ 215 are aggregated at node A 220.

In this example scenario, assume that the network service $S_1$ 210 is subsequently down and it notices the users of $S_1$ 210. Thus, there will not be any traffic accessing network service $S_1$ 210 during the service down time, while existing traffic continues accessing network service $S_2$ 215. However, by looking solely at configurations at C 224, a system may incorrectly infer intents accessing network service $S_1$ 210.

As another example, FIG. 2B illustrates a scenario involving unreachable rules. From the configurations, a system may infer traffic paths from devices associated with engineering department 230/235 to network service S 240. Along the first traffic path from source engineering department 230 to network service S 240, the traffic traverses a firewall 245, which may block traffic from engineering department 230 from reaching switch D 226, the next node in the traffic path to network service S 240. Likewise, along the second traffic path from source engineering department 235 to network service S 240, the traffic traverses a byte counter 250, which may also block the traffic due to the number of bytes transmitted in the traffic flow exceeding a predetermined threshold value. As a result, traffic from engineering department 235 may not be able to reach switch D 226. Therefore, although deriving from configurations alone, the system may infer two different intents: traffic from engineering go through either the firewall 245 or the byte counter 250 and then reach the network service S 240. However, traffic from engineering department 230/235 may not even be able to reach the byte counter, so the more accurate intent should just be: traffic from engineering department 230 go through the firewall 245 and then reach network service S 240. By only looking at the configurations of the network, the system cannot reliably determine where traffic from certain subnet enters the network.

Furthermore, policy routing can be used by routers or network functions like firewalls to implement temporal and/or conditional routing policies. A policy route may be configured to override the default route when a certain condition is matched. The policy routing scenario is illustrated in FIG. 2C. Although there are multiple paths indicated by the configurations, e.g., the default route from A 220 to B 222 to D 226 to F 229 and the policy route from A 220 to C 224 to E 228 to F 229, only one path is active at any given time. However, configurations may inaccurately indicate multiple paths for a single flow.

Figure 3:
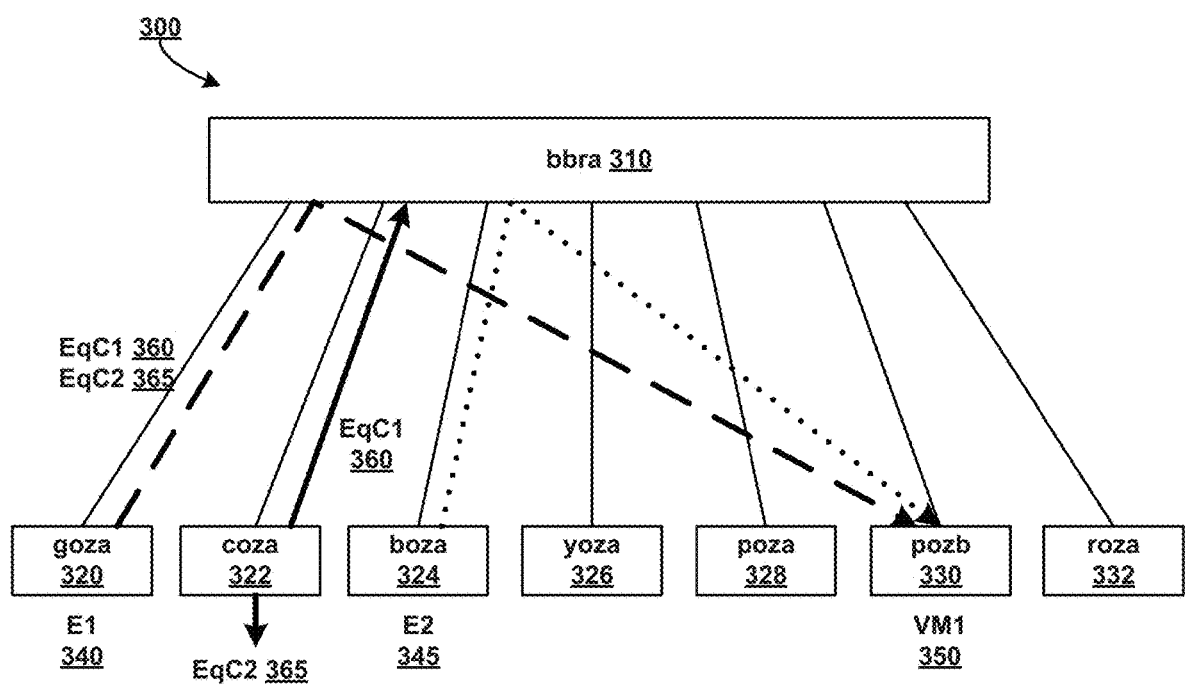
FIG. 3 illustrates an example inference of intents from configurations in a network according to the present disclosure.

Because of the inaccuracies in the intents inferred from configurations alone as described above in FIGS. 2A-2C, the example system according to the present disclosure can infer intents by analyzing data plane configurations to calculate one or more forwarding equivalence classes. FIG. 3 illustrates an example inference of intents from configurations in a network. The example system uses a mini-Stanford backbone network 300 for illustration purposes only to show how to infer intents from data plane configurations. Mini-Stanford backbone network 300 has two main parts: (1) a Mininet builder, which refers to a script using Mininet API to construct a Stanford backbone topology; and (2) a Mahak, which refers to a beacon bundle that can download the OpenFlow configuration files into the Mininet. Mininet-HiFi may facilitate intent-based network troubleshooting.

Here, the original network 300 include 14 edge routers and 2 core routers. To analyze data plane configurations, the example system first calculates forwarding equivalence classes. Each forwarding equivalence class corresponds to a set of packets that have the same forwarding behavior at all routers within the intent based network. Next, the system can traverse all of the identified equivalence classes along the intent-based network to obtain pairwise reachability represented as equivalence classes. For example, there are 16 equivalence classes covered by the path passing through goza 320, bbra 310, and pozb 330 in FIG. 3, including but not limited to, a first equivalence class EqC1 360 and a second equivalence class EqC2 365. These packets passing through the same path belong to different equivalence classes because they have different behaviors at other routers, e.g., routers other than goza 320. Specifically, as shown by the two different paths from router coza 322, the first equivalence class EqC1 360 and the second equivalence class EqC2 365 are forwarded to different ports at router coza 322.

To derive intents, the example system can aggregate equivalence classes along the same path into the same intent. For example, the path from goza 320 to bbra 310 to pozb 330 may indicate an intent from $E_1$ 340 to $VM_1$ 350: $E_1 \rightarrow VM_1$.

In some examples, the system can also aggregate intents across multiple paths based on destination addresses and/or source addresses. For example, the path from boza 324 to bbra 310 to pozb 330 may indicate an intent from $E_2$ 345 to $VM_1$ 350: $E_2\text{-}VM_1$. Then, the system can aggregate on the source addresses corresponding to $E_1$ 340 and $E_2$ 345, and infer intent $E \rightarrow VM_1$, where E is an aggregated label for $E_1$ 340 and $E_2$ 345.

Further, the system can aggregate multiple aggregated intents. Although not shown in the FIG. 3, assuming that there exists a second aggregated intent from the aggregated label E to $VM_2$, which represents a second and different virtual machine from $VM_1$ 350. This second aggregated intent can be represented as $E \rightarrow VM_2$. Then, based on the first aggregated intent $E \rightarrow VM_1$ and the second aggregated intent $E \rightarrow VM_2$, the example system can infer a new and higher level aggregated intent $E \rightarrow VM$. In this example, the first level of aggregation of the intents is based on the source addresses of the flows, whereas the second level of aggregation of the intents is based on the destination addresses of the flows. However, other common attributes of the flows can be used as basis for the aggregation in similar fashions. The system can aggregate two inferred intents when they share at least a common attribute and the same forwarding behavior in the intent based network.

Figure 4:
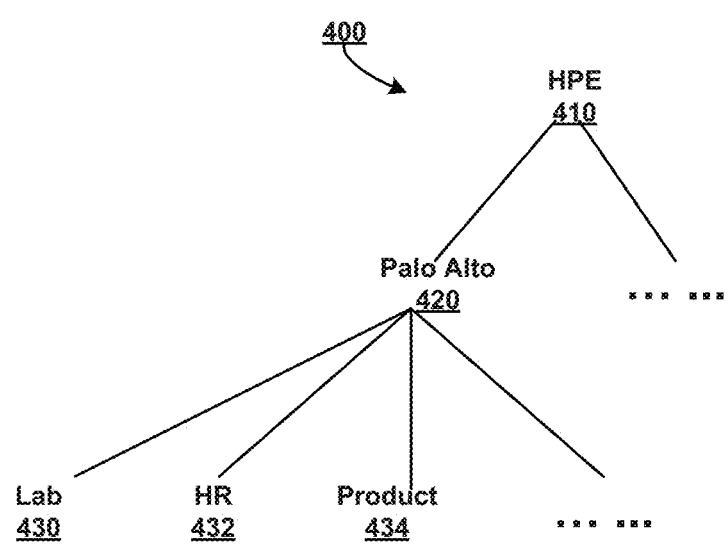
FIG. 4 illustrates an example label tree used to aggregate endpoints according to the present disclosure.

FIG. 4 illustrates an example label tree 400 used to aggregate endpoints according to the present disclosure. Aggregation of endpoints is based on a label tree 400, which maintains the hierarchy relationships of names. For example, the label tree 400 has a root node HPE 410, which represents all devices associated with employees of the company HPE. The root node HPE 410 may have a child node labelled as Palo Alto 420, which may represent all devices located within the Palo Alto location of the HPE. Furthermore, the child node labelled as Palo Alto 420 may have multiple children nodes, such as Lab 430, HR 432, Product 434, etc. Each of these children nodes may correspond to a set of devices associated with a particular employee group, for example, a research laboratory group, a human resource group, a product group, etc., located within the Palo Alto location.

Label tree 400 may not necessarily be complete. Also, intents can be specified using metadata, such as prefixes or labels. The aggregated intent may further provide recommendations to refine labels. The recommendations can provide a reference point to start with the labeling. Note that the system may attempt to aggregate intents to the highest level of labels (e.g., the label closest in distance to the root node in the label tree 400). This means that the system will attempt to represent the intent using the coarsest level of addresses possible. By doing so, the system can effectively reduce the number of runtime monitoring tasks in the intent-based network.

Also, note that due to skewed traffic distribution, most traffic belongs to just a limited number of prefixes. If the traffic is monitored at a low level (e.g., corresponding to leave nodes in the label tree 400), most monitoring tasks would have observed no traffic during the runtime monitoring, which would be inefficient.

In order to improve the efficiency of the runtime monitoring of the intent-based network, the example system performs runtime monitoring with constraints and budget limitations. After potential intents are extracted from data plane configurations as described above, the example system may conduct runtime monitoring. The goal of the runtime monitoring is to infer precise runtime intents over time.

Specifically, to perform runtime monitoring, the example system can divide time T into time slots $T_p$ and assign a monitor capacity to each switch as the budget. The example system will attempt to assign to each intent its available monitor spot and bandwidth requirements. To do so, the example system attempts to solve a plurality of indicator variables. The indicator variables can determine whether a particular intent is monitored at a current time slot and whether a node is assigned to monitor the particular intent.

To formulate the runtime monitoring as an optimization, the example system can define the following constraints:

1. Time T divided into a plurality of time slots $T_p$;
2. Switch resource capacity $C_i$ associated with each time slot. Here, $C_i$ represents the number of flows monitored at the same time at the P switch. In some examples, $C_i$ may also represent the number of rules that a switch can configure.
3. Available monitor spot n(j) for each intent and bandwidth requirement $bw_j$. Here, $bw_j$ represents the estimated bandwidth requirement for the $j^{th}$ flow. Further, n(j) uniquely identifies the location of the switch, e.g., the $j^{th}$ switch.

Moreover, the example system can further define the following indicator variables: $I_j$, $R_{ij}$. On the one hand, indicator variable $I_j$ is a sequence of values indicating whether or not to monitor at a particular location. If the value of $I_j$ is 0, then the example system will not monitor at the $j^{th}$ switch. If the value of $I_j$ is 1, then the example system will monitor at the $j^{th}$ switch. On the other hand, an indicator variable indicates the assignment of a particular flow, e.g., the $i^{th}$ flow, to a particular location, e.g., the $j^{th}$ switch.

The indicator variables are solved with two potentially different goals for optimizing objectives. The first goal is to monitor each intent for an equal amount of time period and as frequently as possible. The first goal can be converted into a bin-packing mechanism. Thus, the example system can assign time slots in a time sequence such that the assignment attempts to minimize the total number of time slots used. That is, the example system can solve for $U_s=1$ if slot s is used, $\min \Sigma_s^T U_s$. Then, the example system can replicate the resulting minimal schedule till the end.

The second goal is to assign a weight, for example, based on real-time traffic volume and/or priority, to each intent and determining monitoring frequency based on the respective weight of each intent. For the second goal, the example system can use joint optimization to maximize the sum of weights over all time slots. That is, the example system can solve for $\max \Sigma_s^T W^* I_{sj}$. The intents with higher weights will be assigned more often than those with lower weights. For each time slot, the example system can keep refining monitoring tasks, which gradually narrow down to more precise intents. In some examples, to reduce the control plane overhead by changing less rules for each time slot, the example system may add penalty to represent monitoring rule change for each intent.

Unlike existing monitoring systems, the example system does not assume that the network administrator is aware of what to monitor and focus on performance metrics of one particular flow or a certain set of flows. To get a full and accurate picture of network runtime, the example system utilizes the intents from configurations as a guide for runtime monitoring. In particular, the example system can use a number of different optimization techniques to determine which flow, where among a number of available switches to place monitoring rules, and when to schedule these rules during a number of divided time slots Tp to monitor the intent-based network in order to maximize monitoring coverage while satisfying an input monitoring budget. The inferred and/or aggregated runtime intents provides an illustrative way for network administrators to understand the high level insights running in the intent-based network. In addition, the inferred and/or aggregated runtime intents can help operators to create or refine existing intents.

Figure 5:
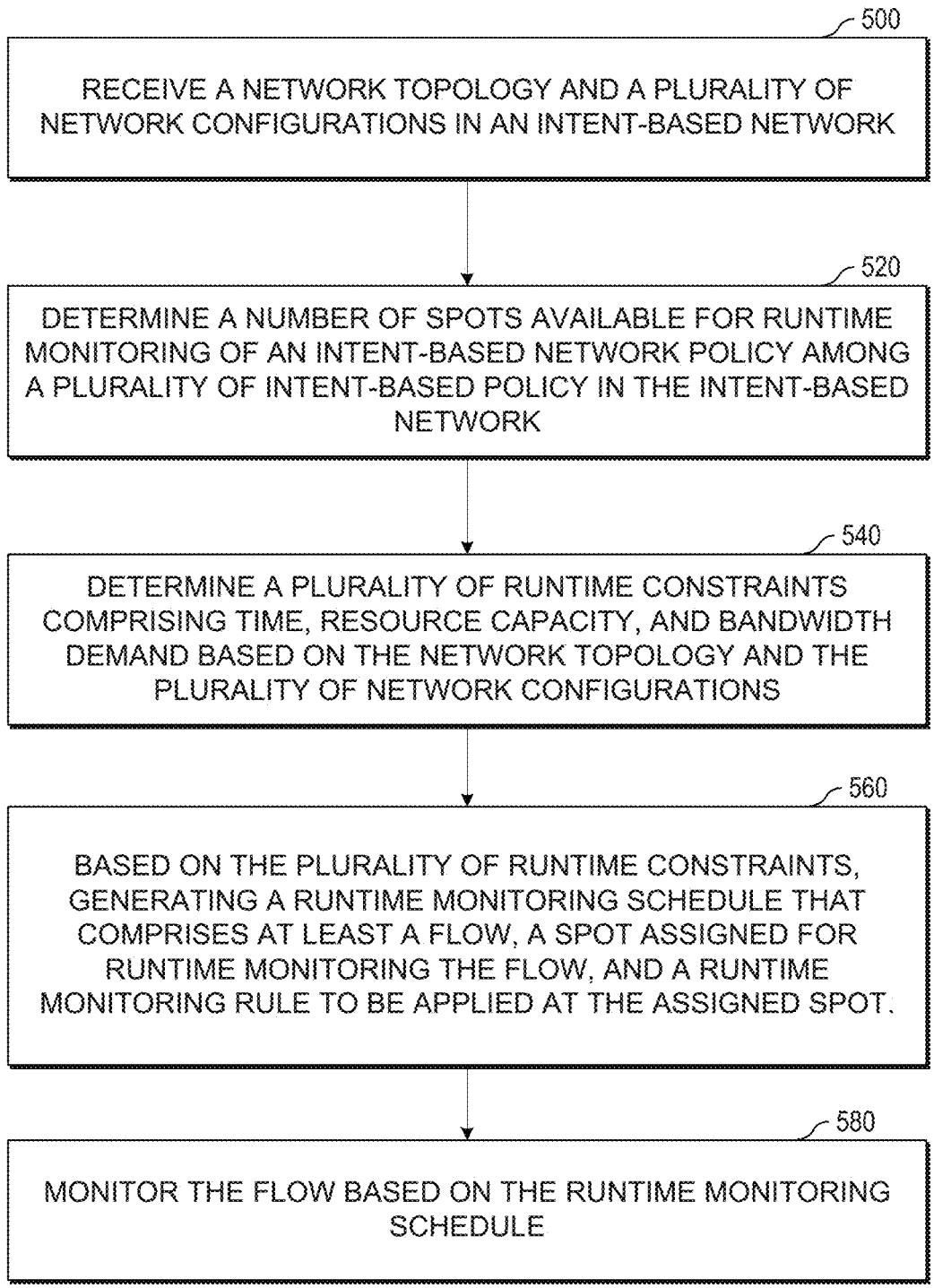
FIG. 5 is an example process of runtime monitoring in intent-based networking according to the present disclosure.

FIG. 5 is an example process of runtime monitoring in intent-based networking according to the present disclosure. During operations, a processor of a network device may receive a network topology and a plurality of network configurations in an intent-based network (operation 500). Then, the network device may determine a number of spots available for runtime monitoring of an intent-based network policy among a plurality of intent-based policy in the intent-based network (operation 520). Next, the network device may determine a plurality of runtime constraints comprising one or more of time, resource capacity, and bandwidth demand based on the network topology and the plurality of network configurations (operation 540). Based on the plurality of runtime constraints, the network device may generate a runtime monitoring schedule that comprises at least a flow, a spot assigned for runtime monitoring of the flow, and a runtime monitoring rule to be applied at the assigned spot (operation 560). Then, the network device can monitor the flow based on the runtime monitoring schedule at the assigned spot (operation 580).

In some examples, the network device can further identify a plurality of equivalence classes by analyzing a plurality of data plane configurations associated with the intent-based network policy.

In some examples, the traffic flows belonging to each of the plurality of equivalence classes are associated with a same set of forwarding behaviors in the intent-based network.

In some examples, the network device can traverse the identified plurality of equivalence classes, and obtain pairwise reachability between endpoint groups in the intent-based network as represented by each equivalence class.

In some examples, the network device can aggregate a first subset of the plurality of equivalence classes along a first path into a first aggregated intent. Here, the first subset of the plurality of equivalence classes share at least a first common attribute. Furthermore, the network device can also aggregate a second subset of the plurality of equivalence classes along a second and different path into a second aggregated intent, whereas the second subset of the plurality of equivalence classes share at least a second and different common attribute. Thereafter, the network device can aggregate the first aggregated intent and the second aggregated intent into a single high level aggregated intent.

In some examples, the first common attribute and/or the second common attribute may include a common source address in the intent-based network and/or a common destination address in the intent-based network.

In some examples, generating the runtime monitoring schedule that comprises at least the flow, the spot assigned for runtime monitoring of the flow, and the runtime monitoring rule to be applied at the assigned spot may further include: dividing a time period T into the number of spots available for runtime monitoring of the intent-based network policy; and assigning a monitoring capacity to each location based on the plurality of runtime constraints by solving a plurality of indicator variables, each indicator variable indicating whether a particular intent is monitored at a particular time slot and whether a particular location is assigned to monitor the particular intent.

In some examples, solving the plurality of indicator variables achieves at least one of (1) a first goal to monitor each intent-based policy frequently and for an equal amount of time period using a bin-packing calculation; and (2) a second goal to assign a weight based on real-time traffic volume and flow priority to each intent-based policy and to determine monitoring frequency based on a respective weight of each intent-based policy using a joint optimization mechanism.

Figure 6:
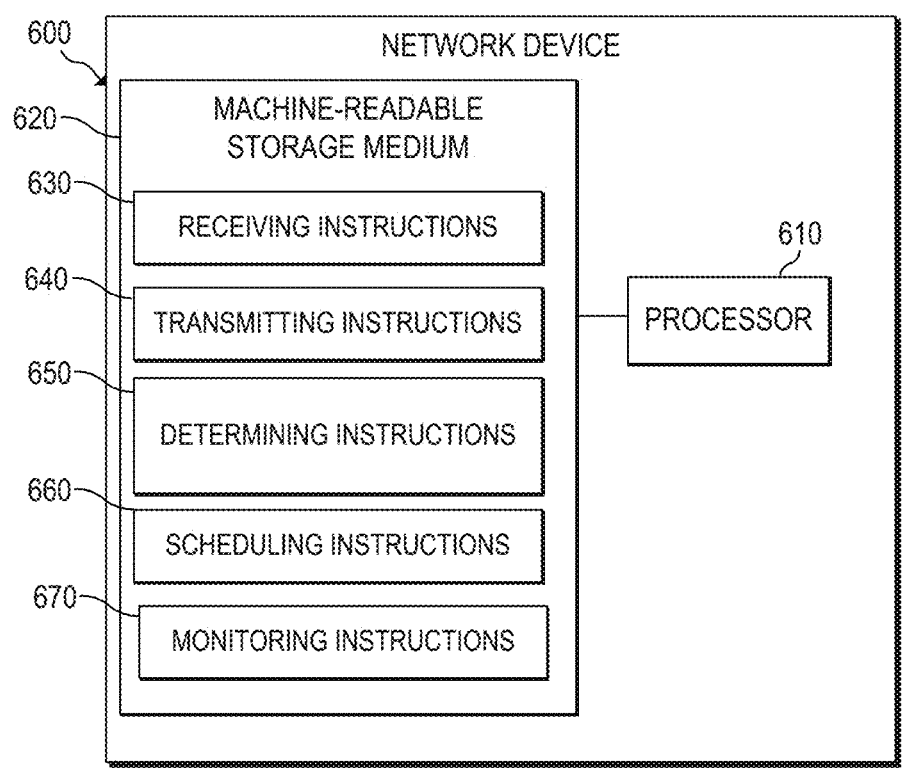
FIG. 6 is a block diagram of an example network device to perform runtime monitoring in intent-based networking according to the present disclosure.

FIG. 6 is a block diagram of an example network device to perform runtime monitoring in intent-based networking according to the present disclosure. As used herein, a network device may be implemented, at least in part, by a combination of hardware and programming. For example, the hardware may comprise at least one processor (e.g., processor 610 which may include one main processor and a plurality of co-processors) and the programming may comprise instructions, executable by the processor(s), stored on at least one machine-readable storage medium (e.g., 620). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 610 may fetch, decode, and execute instructions stored on storage medium 620 to perform the functionalities described below in relation to receiving instructions 630, transmitting instructions 640, determining instructions 650, scheduling instructions 660, and monitoring instructions 670. In other examples, the functionalities of any of the instructions of storage medium 620 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 6, storage medium 620 may be implemented by one machine-readable storage medium, or multiple machine-readable storage media.

Although network device 600 includes at least one processor 610 and machine-readable storage medium 620, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 630-670 may be executed by processor 610 to: receive a network topology and a plurality of network configurations in an intent-based network; determine a number of spots available for runtime monitoring of an intent-based network policy among a plurality of intent-based policy in the intent-based network; determine a plurality of runtime constraints comprising one or more of time, resource capacity, and bandwidth demand based on the network topology and the plurality of network configurations; generate a runtime monitoring schedule that comprises at least a flow, a spot assigned for runtime monitoring of the flow, and a runtime monitoring rule to be applied at the assigned spot based on the plurality of runtime constraints; monitor the flow based on the runtime monitoring schedule at the assigned spot; identify a plurality of equivalence classes by analyzing a plurality of data plane configurations associated with the intent-based network policy; traverse the identified plurality of equivalence classes; obtain pairwise reachability between endpoint groups in the intent-based network as represented by each equivalence class; etc.

Moreover, instructions 630-670 may be executed by processor 610 further to: aggregate a first subset of the plurality of equivalence classes along a first path into a first aggregated intent, wherein the first subset of the plurality of equivalence classes share at least a first common attribute; aggregate a second subset of the plurality of equivalence classes along a second and different path into a second aggregated intent, wherein the second subset of the plurality of equivalence classes share at least a second and different common attribute; aggregate the first aggregated intent and the second aggregated intent into a single high level aggregated intent; etc.

In addition, instructions 630-670 may be executed by processor 610 further to: divide a time period T into the number of spots available for runtime monitoring of the intent-based network policy; assign a monitoring capacity to each location based on the plurality of runtime constraints; solve a plurality of indicator variables, each indicator variable indicating whether a particular intent is monitored at a particular time slot and whether a particular location is assigned to monitor the particular intent, wherein solving the plurality of indicator variables achieves at least one of (1) a first goal to monitor each intent-based policy frequently and for an equal amount of time period using a bin-packing calculation; and (2) a second goal to assign a weight based on real-time traffic volume and flow priority to each intent-based policy and to determine monitoring frequency based on a respective weight of each intent-based policy using a joint optimization calculation; etc.

We claim:

1. A method comprising:
   receiving, by a network device, a network topology comprising an arrangement of network elements and a plurality of network configurations for the network elements in an intent-based network;
   determining, by the network device, a number of monitoring spots available in the intent-based network for runtime monitoring of a particular intent-based network policy among a plurality of intent-based policies, each monitoring spot of the number of monitoring spots being a respective location of a corresponding network element within the arrangement of network elements;
   identifying, by the network device, a plurality of equivalence classes by analyzing a plurality of data plane configurations associated with the particular intent-based network policy;
   determining, by the network device, a plurality of runtime constraints comprising two or more of time, resource capacity, or bandwidth demand based on the network topology and the plurality of network configurations;
   based on the plurality of runtime constraints, generating, by the network device, a runtime monitoring schedule for the runtime monitoring of the particular intent-based network policy, the runtime monitoring schedule comprising at least a flow associated with at least one of the plurality of equivalence classes, an indication of a monitoring spot of the number of monitoring spots that is assigned for runtime monitoring of the flow, and a runtime monitoring rule to be applied at the assigned monitoring spot; and
   performing the runtime monitoring of the particular intent-based network policy in accordance with the runtime monitoring schedule, wherein performing the runtime monitoring comprises remotely monitoring, by the network device, the flow at the assigned monitoring spot at least in part by applying the runtime monitoring rule at the assigned monitoring spot.

2. The method of claim 1, wherein traffic flows belonging to each of the plurality of equivalence classes are associated with a same set of forwarding behaviors in the intent-based network.

3. The method of claim 1, further comprising:
   traversing, by the network device, the identified plurality of equivalence classes; and
   obtaining, by the network device, pairwise reachability between endpoint groups in the intent-based network as represented by each equivalence class.

4. The method of claim 3, further comprising:
   aggregating, by the network device, a first subset of the plurality of equivalence classes along a first path into a first aggregated intent, wherein each equivalence class in the first subset of the plurality of equivalence classes shares at least a first common attribute.

5. The method of claim 4, further comprising:
   aggregating, by the network device, a second subset of the plurality of equivalence classes along a second and different path into a second aggregated intent, wherein each equivalence class in the second subset of the plurality of equivalence classes shares at least a second and different common attribute; and
   aggregating, by the network device, the first aggregated intent and the second aggregated intent into a single high level aggregated intent.

6. The method of claim 4, wherein the first common attribute comprises at least one of a common source address in the intent-based network or a common destination address in the intent-based network.

7. The method of claim 1, wherein generating the runtime monitoring schedule that comprises at least the flow, the monitoring spot assigned for runtime monitoring of the flow, and the indication of the monitoring spot of the number of monitoring spots that is assigned for the runtime monitoring of the flow further comprises:
dividing a time period T into a number of time slots equal to the number of monitoring spots available for the runtime monitoring of the particular intent-based network policy; and
assigning a monitoring capacity to each monitoring spot based on the plurality of runtime constraints by solving a plurality of indicator variables, each indicator variable indicating whether a particular intent is monitored at a particular time slot and whether a particular monitoring spot is assigned to monitor the particular intent.

8. The method of claim 7, wherein solving the plurality of indicator variables achieves at least one of (1) a first goal to monitor each intent-based policy frequently and for an equal amount of time period using a bin-packing calculation; or (2) a second goal to assign a weight based on real-time traffic volume and flow priority to each intent-based policy and to determine monitoring frequency based on a respective weight of each intent-based policy using a joint optimization mechanism.

9. A network device comprising at least:
a memory;
a processor executing instructions in the memory to:
receive a network topology comprising an arrangement of network elements and a plurality of network configurations for the network elements in an intent-based network;
determine a number of monitoring spots available in the intent-based network for runtime monitoring of a particular intent-based network policy among a plurality of intent-based policies, each monitoring spot of the number of monitoring spots being a respective location of a corresponding network element within the arrangement of network elements;
identify a plurality of equivalence classes by analyzing a plurality of data plane configurations associated with the particular intent-based network policy;
determine a plurality of runtime constraints comprising two or more of time, resource capacity, or bandwidth demand based on the network topology and the plurality of network configurations;
generate, based on the plurality of runtime constraints, a runtime monitoring schedule for the runtime monitoring of the particular intent-based network policy, the runtime monitoring schedule comprising at least a flow associated with at least one of the plurality of equivalence classes, an indication of a monitoring spot of the number of monitoring spots that is assigned for runtime monitoring of the flow, and a runtime monitoring rule to be applied at the assigned monitoring spot; and
perform the runtime monitoring of the particular intent-based network policy in accordance with the runtime monitoring schedule, wherein performing the runtime monitoring comprises remotely monitoring the flow at the assigned monitoring spot at least in part by applying the runtime monitoring rule at the assigned monitoring spot.

10. The network device of claim 9, wherein traffic flows belonging to each of the plurality of equivalence classes are associated with a same set of forwarding behaviors in the intent-based network.

11. The network device of claim 9, wherein the processor further executes the instructions in the memory to:
traverse the identified plurality of equivalence classes; and
obtain pairwise reachability between endpoint groups in the intent-based network as represented by each equivalence class.

12. The network device of claim 11, wherein the processor further executes the instructions in the memory to:
aggregate a first subset of the plurality of equivalence classes along a first path into a first aggregated intent, wherein each equivalence class in the first subset of the plurality of equivalence classes shares at least a first common attribute.

13. The network device of claim 12, wherein the processor further executes the instructions in the memory to:
aggregate a second subset of the plurality of equivalence classes along a second and different path into a second aggregated intent, wherein each equivalence class in the second subset of the plurality of equivalence classes shares at least a second and different common attribute; and
aggregate the first aggregated intent and the second aggregated intent into a single high level aggregated intent.

14. The network device of claim 12, wherein the first common attribute comprises at least one of a common source address in the intent-based network or a common destination address in the intent-based network.

15. The network device of claim 9, wherein the processor further executes the instructions in the memory to:
divide a time period T into a number of time slots equal to the number of monitoring spots available for the runtime monitoring of the particular intent-based network policy; and
assign a monitoring capacity to each monitoring spot based on the plurality of runtime constraints by solving a plurality of indicator variables, each indicator variable indicating whether a particular intent is monitored at a particular time slot and whether a particular monitoring spot is assigned to monitor the particular intent.

16. The network device of claim 15, wherein solving the plurality of indicator variables achieves at least one of (1) a first goal to monitor each intent-based policy frequently and for an equal amount of time period using a bin-packing calculation; and (2) a second goal to assign a weight based on real-time traffic volume and flow priority to each intent-based policy and to determine monitoring frequency based on a respective weight of each intent-based policy using a joint optimization calculation.

17. A non-transitory machine-readable storage medium encoded with instructions executable by a processor of a computing device, the non-transitory machine-readable storage medium comprising instructions to:
receive a network topology comprising an arrangement of network elements and a plurality of network configurations for the network elements in an intent-based network;
determine a number of monitoring spots available in the intent-based network for runtime monitoring of a particular intent-based network policy among a plurality of intent-based policies, each monitoring spot of the number of monitoring spots being a respective location of a corresponding network element within the arrangement of network elements;

identify, by the network device, a plurality of equivalence classes by analyzing a plurality of data plane configurations associated with the particular intent-based network policy;

determine a plurality of runtime constraints comprising two or more of time, resource capacity, or bandwidth demand based on the network topology and the plurality of network configurations;

generate, based on the plurality of runtime constraints, a runtime monitoring schedule for the runtime monitoring of the particular intent-based network policy, the runtime monitoring schedule comprising at least a flow associated with at least one of the plurality of equivalence classes, an indication of a monitoring spot assigned for runtime monitoring of the flow, or a runtime monitoring rule to be applied at the assigned monitoring spot; and perform the runtime monitoring of the particular intent-based network policy in accordance with the runtime monitoring schedule, wherein performing the runtime monitoring comprises remotely monitor the flow at the assigned monitoring spot, at least in part by applying the runtime monitoring rule at the assigned monitoring spot.

18. The non-transitory machine-readable storage medium of claim 17, further comprising instructions to:

aggregate a first subset of the plurality of equivalence classes along a first path into a first aggregated intent, wherein each equivalence class in the first subset of the plurality of equivalence classes shares at least a first common attribute;

aggregate a second subset of the plurality of equivalence classes along a second and different path into a second aggregated intent, wherein each equivalence class in the second subset of the plurality of equivalence classes shares at least a second and different common attribute; and aggregate the first aggregated intent and the second aggregated intent into a single high level aggregated intent.

\* \* \* \* \*